(12) United States Patent
Weber

(10) Patent No.: US 9,968,951 B2
(45) Date of Patent: May 15, 2018

(54) FLUIDIZING UNIT FOR POWDER MEDIA

(71) Applicant: Akzo Nobel Coatings International B.V., Arnhem (NL)

(72) Inventor: Rolf Weber, Hilden (DE)

(73) Assignee: Akzo Nobel Coatings International B.V., Arnhem (NL)

( * ) Notice: Subject to any disclaimer, the term of this patent is extended or adjusted under 35 U.S.C. 154(b) by 56 days.

(21) Appl. No.: 15/127,918

(22) PCT Filed: Mar. 11, 2015

(86) PCT No.: PCT/EP2015/055033
§ 371 (c)(1),
(2) Date: Sep. 21, 2016

(87) PCT Pub. No.: WO2015/140019
PCT Pub. Date: Sep. 24, 2015

(65) Prior Publication Data
US 2017/0106383 A1    Apr. 20, 2017

(30) Foreign Application Priority Data

Mar. 21, 2014  (EP) ...................................... 1461001

(51) Int. Cl.
*B05B 7/14*    (2006.01)
*B05D 1/12*    (2006.01)
*B05C 19/02*   (2006.01)

(52) U.S. Cl.
CPC ............ *B05B 7/1404* (2013.01); *B05C 19/02* (2013.01); *B05D 1/12* (2013.01)

(58) Field of Classification Search
CPC ... B05B 7/1404; B01J 8/18118; B01J 8/1872; B01J 8/44
See application file for complete search history.

(56) References Cited

U.S. PATENT DOCUMENTS 5,015,126 A * 5/1991 Kramer ................. B05B 7/1404
                                                    406/134
6,431,435 B1    8/2002 Jones et al.
(Continued)

FOREIGN PATENT DOCUMENTS

DE     103 05 019 A1    8/2004
WO     2010/040787 A2   10/2011

OTHER PUBLICATIONS

International Search Report dated May 15, 2015 in PCT/EP2015/055033 filed Mar. 11, 2015.

*Primary Examiner* — Xiao S Zhao
(74) *Attorney, Agent, or Firm* — McDonnell Boehnen Hulbert & Berghoff LLP

(57) ABSTRACT

The present invention relates to a fluidizing unit, comprising a cardboard structure 2, a deformable receptacle 3 disposed within the cardboard structure 2, and a fluidizing means 4 disposed within the deformable receptacle 3 and comprising a container 4a and a fluidizing base 4b covering the container 4a, the container 4a and the fluidizing base 4b constituting the outer walls of a pressure chamber 4c which can be charged with compressed air, the fluidizing means 4 further comprising a supply line 4d for compressed air, which opens out via the fluidizing base into the pressure chamber, and also a seal 4e which spans the periphery of the container 4a and is designed such that the interior 5 of the deformable receptacle 3 is separated into two regions 5a and 5b separate from one another.

15 Claims, 1 Drawing Sheet

(56) References Cited

U.S. PATENT DOCUMENTS

| | | | | |
|---|---|---|---|---|
| 6,810,929 B1* | 11/2004 | Tansey | ................... | B05B 7/144 |
| | | | | 141/231 |
| 2011/0243800 A1 | 10/2011 | Gallmetzer et al. | | |
| 2013/0108379 A1* | 5/2013 | Mauchle | .............. | B05B 7/1404 |
| | | | | 406/110 |

* cited by examiner

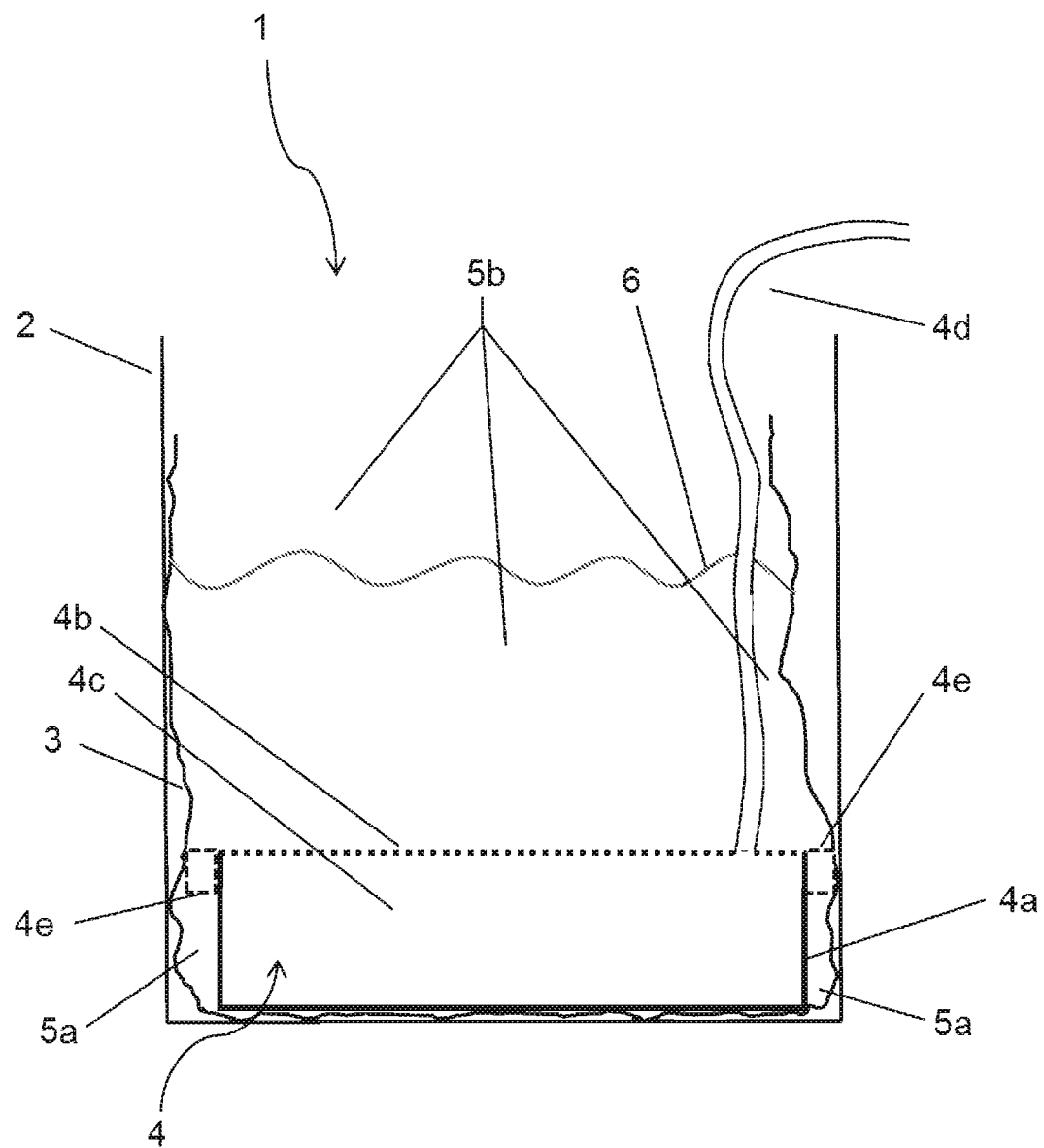

FLUIDIZING UNIT FOR POWDER MEDIA

The present invention relates to a fluidizing unit comprising a fluidizing means with a pressure chamber and a fluidizing base. As well as for the fluidization of pulverulent media, more particularly powder coating materials, the fluidizing unit may also serve for the storage and transport of such pulverulent media, thereby avoiding, in particular, labor-intensive transfer operations as part of the processing chain of pulverulent media.

Pulverulent media, more particularly powder coating materials, have a number of noteworthy advantages by comparison with the products with which they compete, more particularly liquid products which in general comprise organic solvents. These advantages are viewed more particularly as lying in the fact that in the processing of powder coating materials, in other words their application to a substrate and subsequent curing to produce coatings, the overspray, as it is known, is not irrevocably lost, but can instead be recovered. The situation is different for the application of liquid coating materials, for which the overspray is irrevocably lost. Overspray, as is known, is the fraction of the coating material which at the application stage is not deposited on the substrate but is instead dispersed in the surrounding area as an inevitable consequence of the substrate geometry and application-system geometry and also of the system technology. A further advantage of powder coating materials lies obviously in the avoidance of environmentally polluting organic solvents.

Within the powder processing industry, more particularly in the painting sector in the context of the processing of powder coating materials, however, the powders for use must generally be fluidized prior to their actual processing. Fluidization is understood, as is known, to constitute the preparation of the powder by blown introduction of compressed air, forming a powder/air mixture which has liquid like properties and hence is in a conveyable state. This is critical to appropriate conveying within the line networks of application systems, and hence for the processing of powder coating materials. The fluidization is often assisted by shaking and/or stirring of the powder.

The fluidizing systems nowadays available are generally capable of bringing about fluidization such as to satisfy the requirements. In these systems, a powder coating material is transferred to a receptacle (powder receptacle) which has a conventional fluidizing base. Located beneath the fluidizing base is a pressure chamber, which can be charged with compressed air. Through the fluidizing base—that is, a base consisting at least proportionately of porous material through which air can flow, the compressed air then enters into the powder coating material, which is present in its intended receptacle and is effectively fluidized in this way.

Problems, however, are that the systems known from the prior art are comparatively big and bulky, and represent permanently installed plant components. A powder coating material must first be transferred from the supply drum into the powder receptacle of the fluidizing system, a transfer operation. This therefore requires an additional workstep. Account must also be taken of the problem of the intense dusting in the course of the transfer. A further disadvantage is that the permanently installed plants do not allow any variability in the location of painting. The painting must be done in the same location where the permanently installed fluidizing plant is set up. Painting at different locations to take account of individual circumstances, such as of substrates already permanently installed at their intended location, is therefore not possible.

Fluidization within the supply drum, using conventional fluidizing lances, is known in the prior art. In many cases, however, the only partial fluidization that occurs in this case is inadequate to ensure that the powder coating material is given a conveyability that satisfies the requirements.

It was an object of the present invention, accordingly, to provide a fluidizing unit which is able to fluidize a pulverulent medium effectively via a fluidizing base, but which nevertheless ensures that there is no need for transfer operations and that powder coating can take place at variable locations. The unit, then, is to be able to serve both for the fluidization of pulverulent media, more particularly powder coating materials, and for the storage and the transport of such powder coating materials. The powder coating material for ultimate processing, then, is not only to be stored and transported in this unit, but also fluidized effectively via a fluidizing base, directly within the unit, without labor-intensive transfer operations. The powder coating material then fluidized would then be able to be transferred directly from the unit, and hence locally, independently, into an application system, and therefore processed or applied.

It has been possible to achieve these objects by means of a fluidizing unit, comprising a cardboard structure 2, a deformable receptacle 3 disposed within the cardboard structure 2, and a fluidizing means 4 disposed within the deformable receptacle 3 and comprising a container 4a and a fluidizing base 4b covering the container 4a, the container 4a and the fluidizing base 4b constituting the outer walls of a pressure chamber 4c which can be charged with compressed air, the fluidizing means 4 further comprising a supply line 4d for compressed air, which opens out via the fluidizing base into the pressure chamber, and also a seal 4e which spans the periphery of the container 4a and is designed such that the interior 5 of the deformable receptacle 3 is separated into two regions 5a and 5b separate from one another.

The fluidizing unit of the invention serves not only for the transport, and the storage of pulverulent, media but also, furthermore, the fluidization of such media. In particular, labor-intensive transfer operations are avoided.

The invention is to be illustrated hereinafter using a FIG. 1. Identical reference symbols correspond to identical or corresponding features.

FIG. 1 shows on an exemplary basis a fluidizing unit of the invention, or a vertical section through such a unit, the unit of the invention containing a powder coating material. In detail, FIG. 1 shows a fluidizing unit 1 of the invention, comprising a cardboard structure 2, in which a deformable receptacle 3 is located. Located within the deformable receptacle 3 is a fluidizing means 4. The means 4 comprises a container 4a, which is covered by a fluidizing base 4b. The container 4a and the fluidizing base 4b covering the container 4a constitute the outer walls of a pressure chamber 4c which can be charged with compressed air. The fluidizing means 4 further comprises a supply line 4d for compressed air, which opens via the fluidizing base into the pressure chamber. The means 4 further comprises a seal 4e, which spans the periphery of the container 4a and is disposed in such a way that the interior 5 of the deformable receptacle 3 is separated into two regions 5a and 5b separate from one another. While the interior 5b disposed above the seal 4e can be filled at least partly with a powder coating material (represented in FIG. 1 by the surface 6 of the powder coating material), the separation by the seal 4e means that no powder coating material, or only a small fraction of this material, is able to enter the interior 5a.

The unit 1 comprises a cardboard structure 2. In connection with the present invention, the term "cardboard structure" is understood as follows. It comprises, very generally, a pack or packaging of the type that is known per se. This pack therefore envelops the deformable receptacle 3 contained therein, and hence also envelops the fluidizing means 4. Suitable material for the pack 2 includes conventional packaging materials, examples being plastic and card or board. Preferably, however, the cardboard structure 2 consists of cardboard, meaning, in line with the general definition of such cardboard structures, that it constitutes a cardboard pack. The cardboard structure 2 may be shaped in the form of any desired pack—in other words, as far as the geometry of the pack is concerned, there are not specific restrictions at all. A cuboidal or else cylindrical geometry is possible, for example. Preferably, however, as shown in FIG. 1, for example, the cardboard pack possesses a cuboidal form, as for example a cube form. This cuboid may be open on one side. Preferably, however, it is a cuboid which is fully sealable, having six faces. The further constituents of the fluidizing unit are then present in the cardboard structure. The cardboard structure may then be opened on one side, for example, to allow the removal, as described later on below, of the fluidized pulverulent, medium (compare also FIG. 1).

Within the cardboard structure 2, the unit 1 comprises a deformable receptacle 3. In particular, therefore, this is a bag or a pouch. The receptacles consist of paper or plastic, for example. It is preferably a plastics pouch. Plastics pouches of this kind, and in particular their use in the packaging of pulverulent media such as powder coatings materials, are known. They consist, for example, of polyolefins such as polyethylene or polypropylene, of polyvinyl chloride, polystyrene, polyesters, or polycarbonates, the plastic being in the processed form of a film. Plastics films of these kinds possess layer thicknesses, for example, of about 0.1 millimeter, and are therefore deformable. A common feature of these materials, therefore, is that they are able to adapt in terms of their shape—that is, are deformable. In this way, they can be inserted readily into the cardboard structure 2, while the means 4 described below can be placed—again readily—into the receptacle 3. It is possible consequently for a pulverulent medium to be filled readily into the receptacle 3. The size and exact geometry of the deformable receptacle is of course preferably adapted in such a way as to correspond optimally to the size and geometry of the cardboard structure 2, in other words, in particular, to have the capacity for approximately complete filling of the cardboard structure, but not to be too large for the cardboard structure (compare also FIG. 1). Such adaptation can be accomplished simply. The deformable receptacle 3 may also be provided with a commonplace closure known per se, such as a press closure or zip closure, for example. It is also possible, however, for the receptacle 3, the plastics pouch for example, to be reversibly sealable in a simple way by means of a closure wire or the like. Such sealing is appropriate in order to prevent the emergence of a pulverulent medium generally contained.

Within the deformable receptacle 3, the unit 1 comprises fluidizing means 4. As also apparent from FIG. 1, the means 4, more particularly the container 4a of this means, is preferably disposed such that it stands on the base of the cardboard structure, the plastics pouch 3 still, of course, being disposed between the bottom side of the means 4, more particularly of the container 4a, and the top side of the base of the cardboard structure 2.

The fluidizing means 4 comprises a container 4a and a fluidizing base 4b covering the container 4a. The container 4a consists preferably of a plastics material, as for example of a thermoplastic such as acrylonitrile-butadiene-styrene (ABS), polyamide (PA), polylactate (PLA), polymethyl methacrylate (PMMA), polycarbonate (PC), polyethylene terephthalate (PET), polyolefins such as polyethylene (PE) and polypropylene (PP), polystyrene (PS), polyetheretherketone (PEEK), and polyvinyl chloride (PVC), especially preferably polyolefins.

The container 4a is preferably (at any rate, at temperature which are not elevated, in other words, more particularly, at temperatures of less than 50° C., for example) a rigid or stiff body. In particular, therefore, such containers are dimensionally stable, and thus differ, for example, from plastics pouches 3. Dimensionally stable bodies of this kind may be produced, for example, by injection molding processes, using the thermoplastics stated above. The conditions which are necessary accordingly in order to produce a rigid and dimensionally stable container—for example, the layer thickness of the walls of the container 4a—may be adapted in a known way.

The geometry of the container 4a may be selected arbitrarily, provided the geometry allows the container to be coverable with a fluidizing base as described below. Preferably, however, the container is a cuboid in which one face is cut away—in other words, then, it is a box which is open at one side (to the top) and which has, accordingly, five faces (compare FIG. 1). The container 4a is preferably a box formed in one piece from a thermoplastic by means of injection molding processes. The geometry, and in particular also the size, of this container sire of course preferably adapted so as to correspond optimally to the size and geometry of the cardboard structure 2 and of the deformable receptacle 3. This means that the design of the container 4a is such that it can be disposed in the receptacle 3 and, moreover, very largely covers the base area or bottom of the cardboard structure 2 (compare FIG. 1).

The container 4a is covered with a fluidizing base 4b. Fluidizing bases are known. They are sheet like designed structural elements which consist at least partly of porous material through which air can flow. At least 90% of the area of the fluidizing base 4b consists preferably of a porous material of this kind. In this way, air can be made to flow through the base effectively. Only marginal regions of the base 4b, situated close to or in contact with the container 4a, may be designed, for example, in homogeneous, air-impermeable material, in order to allow the two components to be screwed together or adhesively bonded to one another via these regions, for example. Porous material used may comprise, as is known, porous polyolefins, porous metal sintering substances, porous ceramics, porous thermosets, porous mineral materials and also porous organic materials such as cellulose-based porous materials. Preferred fluidizing bases are those in which the porous material is based on polyolefins, more particularly polyethylene. Porous materials of these kinds are available, for example, under the trade name Poroplast from Durst, Germany.

The container 4a and the fluidizing base 4b covering the container 4a constitute the outer walls of a pressure chamber 4c, which can be charged with compressed air. Accordingly, the overall construction made up of these two components is designed such that an elevated pressure can be built up and the corresponding air is able to escape upwardly though the porous base (compare FIG. 1). The two components may, for example, be screwed or adhesively bonded to one another, in which case further components may also be employed, such as seals, reinforcing plates, or the like. In one preferred variant, the components 4a and 4b are joined to one another by injection molding. This means that the fluidizing base 4b is inserted into the injection mold for producing the container 4a, and the container is then produced by injection molding, in a procedure which is accompanied by a melting and hence joining of the base to the container that is formed. It follows from what has been said above that the container 4a and the fluidizing base 4b preferably form the outer walls of a cuboidal pressure chamber. In this arrangement, the base 4b is then preferably disposed horizontally, and forms the upper face of the cuboid (in this context, the terms "horizontal" and "upper face" refer, of course, to the orientation within a fluidizing unit of the invention shown in FIG. 2, for example; the same principle applies throughout the context of the present invention).

The fluidizing means further comprises a supply line 4d for compressed air, which opens via the fluidizing base into the pressure chamber 4c. This line may be a typical compressed air hose line, known per se, which can be connected in a known way to corresponding compressed air systems, allowing the pressure chamber to be charged with compressed air. One particular advantage of the present invention lies in the arrangement of the supply line 4d. Within a fluidizing unit which contains a pulverulent medium within the plastics pouch, the supply line may protrude from this medium, with the protruding part of the line 4d being rolled up and therefore positioned within the closed cardboard structure. After the cardboard structure has been opened, in particular from the upper face of the cardboard structure, the line 4d can easily be connected to a compressed air source and hence the fluidization of the pulverulent medium—a powder coating material, for example—can be commenced directly. It is also possible, of course, for at least the rolled up part of the supply line to be disposed outside the deformable receptacle, so that, in that case, the part of the line which is to be gripped for the purpose of connection to a compressed air source is not contaminated with the pulverulent medium. In the context of the present invention, nevertheless, part of the definition of such an arrangement is that the fluidizing means 4 is disposed within the receptacle 3, since the complete means 4 is disposed within the receptacle 3, apart from the stated section of the line 4d.

In one preferred embodiment, the point at which the supply line 4d opens into the fluidizing base 4b and hence into the pressure chamber 4c is located in the marginal region of the fluidizing base (compare FIG. 1). Accordingly, the supply line can be disposed simply within the fluidizing unit in such a way that it does not prove a hindrance when a pulverulent material—a powder coating material, for example—is removed, in other words providing sufficient space for introduction of conveying lines and the like into the unit. It is again particularly preferred here if the supply line 4d does not end at the point of contact with the fluidizing base, but instead if it extends into the center of the pressure chamber 4c. This is brought about preferably via a line section, fabricated from a dimensionally stable material, within the pressure chamber. In this way, the compressed air is discharged in the center of the pressure chamber, allowing the compressed air to penetrate the powder coating material lying above the fluidizing base, in homogeneous distribution over the entire fluidizing base, and allowing uniform fluidization to be produced.

The fluidizing means 4 further comprises a seal 4e which spans the periphery of the container 4a and is disposed such that the interior 5 of the deformable receptacle 3 is separated into two regions 5a and 5b separate from one another (compare FIG. 1). The fluidizing base is disposed such that it is fully in direct contact with the upper region of the interior 5 (in FIG. 1, the region 5b). Separation is achieved in this way, and ensures that when the pouch 3 is filled with a pulverulent material, the region situated beneath the seal 4e, in which it is not possible for compressed air to flow in via the fluidizing base, remains very largely free from said pulverulent material. The pulverulent material, more particularly the powder coating material, instead remains in the region disposed above the seal. In this way, no powder coating material is wasted; instead, almost the entire powder coating material can be fluidized and hence used for the application. Remaining possibly unused are only small amounts, which are able to enter by free flow into the lower region, owing to incompletely idealized sealing. The seal is made from materials commonly used for such seals. For example, the seal may be manufactured from foamable flexible organic materials. Examples include foamed flexible polyurethanes, synthetic rubber, natural rubber, foamable flexible polyolefins, or else foamable flexible thermosets.

A pulverulent medium, more particularly a powder coating material, may be filled into the fluidizing unit of the invention. The powder coating material is then disposed within the deformable receptacle 3 and above the seal 4e, and is therefore lying on the fluidizing base 4b (compare FIG. 1). The unit of the invention may serve as a serial pack for powder coating materials, meaning that powder coating materials can be stored and transported in such units. If the powder coating material is to be processed, processing may be commenced directly by opening of the cardboard structure and of the plastics pouch and also connecting the supply line to compressed air, without labor-intensive transfer operations and without local restrictions, by means, for example, of conveying the fluidized powder into an application system such as a powder gun.

The present invention accordingly further provides a method for processing a pulverulent medium, more particularly a powder coating material, by fluidizing powder coating material disposed in a fluidizing unit of the invention, in the unit, conveying the fluidized powder coating material from the unit into an application supply, and applying it to a substrate, with no operation of transferring the powder coating material taking place within the process.

Likewise provided by the present invention is the use of a unit of the invention for the simultaneous transport, storage, and fluidization of a pulverulent medium, more particularly of a powder coating material. The expression "simultaneously" is not to be understood here to mean contemporaneously, but instead expresses the fact that all of the stated operations—that is, transport, storage, and fluidization—take place within the unit, without intermediate transfer operations taking place.

What is claimed is:

1. A fluidizing unit, comprising a cardboard structure, a deformable receptacle disposed within the cardboard structure, and a fluidizer disposed within the deformable receptacle and comprising a container and a fluidizing base covering the container, the container and the fluidizing base constituting the outer walls of a pressure chamber which can be charged with compressed air, the fluidizer further comprising a supply line for compressed air, which opens out via the fluidizing base into the pressure chamber, and also a seal (4e) which spans the periphery of the container and is designed such that the interior of the deformable receptacle is separated into two regions separate from one another.

2. The fluidizing unit of claim 1, wherein the cardboard structure is a cardboard pack.

3. The fluidizing unit of claim 1, wherein the cardboard structure is cuboidal.

4. The fluidizing unit of claim 1, wherein the deformable receptacle is a plastics pouch.

5. The fluidizing unit of claim 1, wherein the fluidizer stands on the base of the cardboard structure, the deformable receptacle being disposed between the bottom side of the means and the top side of the base of the cardboard structure.

6. The fluidizing unit of claim 1, wherein the container is dimensionally stable and comprises a thermoplastic.

7. The fluidizing unit of claim 1, wherein the container is a cuboidal box from which the top face has been cut away, with the fluidizing base covering the region of the cut away face.

8. The fluidizing unit of claim 1, wherein the fluidizing base comprises, as porous material, porous polyolefins, porous metal sintering substances, porous ceramics, porous thermosets, porous mineral materials and/or porous organic materials.

9. The fluidizing unit of claim 1, wherein the seal comprises foamed flexible polyurethanes, synthetic rubber, natural rubber, foamed flexible polyolefins and/or foamable flexible thermosets.

10. The fluidizing unit of claim 1, comprising a pulverulent medium within the deformable receptacle and above the seal and also lying on the fluidizing base.

11. The fluidizing unit of claim 10, wherein the pulverulent medium is a powder coating material.

12. A process for processing a pulverulent medium, the process comprising fluidizing the pulverulent medium disposed in the fluidizing unit of claim 1, conveying the fluidized medium from the fluidizing unit into an application system, and then applying the fluidized medium to a substrate, with no operation of transferring the fluidized medium taking place within the process.

13. The process of claim 12, wherein the pulverulent medium is a powder coating material.

14. A process comprising transporting, storing and fluidizing a pulverulent medium with the fluidizing unit of claim 1, wherein no intermediate transfer operations occur during the transport, the storage, and the fluidization.

15. The process of claim 14, wherein the pulverulent medium is a powder coating material.

* * * * *